US006685378B2

(12) United States Patent
Huang et al.

(10) Patent No.: US 6,685,378 B2
(45) Date of Patent: Feb. 3, 2004

(54) COUPLER HAVING A SOLID LOCKING PIN DEVICE

(76) Inventors: Vincent Huang, P.O.Box 10-69, Chong Ho, Taipei (TW), 235; Jim Huang, P.O.Box 10-69, Chong Ho, Taipei (TW), 235

( * ) Notice: Subject to any disclaimer, the term of this patent is extended or adjusted under 35 U.S.C. 154(b) by 0 days.

(21) Appl. No.: 10/124,703

(22) Filed: Apr. 12, 2002

(65) Prior Publication Data

US 2003/0194267 A1 Oct. 16, 2003

(51) Int. Cl.$^{7}$ .................................................. B23P 11/00

(52) U.S. Cl. ......................... 403/150; 403/13; 403/153; 403/155; 29/437

(58) Field of Search .......................... 403/65, 161, 279, 403/324, 153, 150, 13, 14, 154, 155; 29/3, 11, 437

(56) References Cited

U.S. PATENT DOCUMENTS

| | | | | | |
|---|---|---|---|---|---|
| 2,847,238 | A | * | 8/1958 | Bolling, Jr. | 403/154 |
| 3,209,446 | A | * | 10/1965 | Nicholas | 29/434 |
| 5,077,918 | A | * | 1/1992 | Garman | 37/452 |
| 5,769,470 | A | * | 6/1998 | Toyomura | 292/327 |
| 5,950,295 | A | * | 9/1999 | Worden et al. | 29/423 |
| 6,092,958 | A | * | 7/2000 | Gale | 403/378 |

* cited by examiner

*Primary Examiner*—Lynne H. Browne
*Assistant Examiner*—Kenn Thompson

(57) ABSTRACT

A coupler includes one or more pairs of ears each having an orifice, a lever having one end engaged between the ears and having an aperture aligned with the orifices of the ears for receiving a locking pin. The locking pin includes a head formed on one end and having an inner flat peripheral surface for solidly engaging with the ears, and includes an opening formed in a peripheral wall which may be expanded radially outward to engage with the ears, for solidly securing the locking pin to the ears. A retaining ring may solidly secure the locking pin to the ears.

1 Claim, 5 Drawing Sheets

23 21 20 23 21 22 31 24 30 14 15 16 10 11

11 12 13 15 16 14 18 17 10

COUPLER HAVING A SOLID LOCKING PIN DEVICE

BACKGROUND OF THE INVENTION

1. Field of the Invention

The present invention relates to a coupler or an object, and more particularly to a coupler or an object including a solid locking pin device.

2. Description of the Prior Art

Typical couplers or objects may comprise one or more handles or hand grips or arms or levers pivotally or rotatably secured to the objects with one or more rivets or locking pins. Normally, the locking pins includes a head formed or provided on one end thereof, and includes the other end having a solid structure and to be stricken with a hammer device or to be forged with a rivet device, and thus to be deformed in order to engage with the object and to rotatably or pivotally securing the locking pin to the object. However, the deformed end of the locking pin normally may not be completely deformed and may not be solidly secured to the object, such that the deformed end of the locking pin may be easily become loose after use.

The present invention has arisen to mitigate and/or obviate the afore-described disadvantages of the conventional coupler or an objects.

SUMMARY OF THE INVENTION

The primary objective of the present invention is to provide a coupler or an object including a locking pin having a solid securing structure for allowing the locking pin to be solidly securing to the object.

In accordance with one aspect of the invention, there is provided an object comprising a body including a pair of ears having a channel formed between the ears, the ears each including an orifice formed therein, a lever including a, first end received in the channel of the body, and having an aperture formed therein for aligning with the orifices of the ears, and a locking pin engaged through the orifices of the ears and the aperture of the lever, for pivotally securing the lever to the ears, the locking pin including a first end having a head provided thereon, the head including an inner portion having a flat peripheral surface formed thereon for flatly engaging with a first of the ears, the locking pin including a second end having an opening formed therein and a peripheral wall provided thereon for defining the opening thereof, and the peripheral wall being allowed to be expanded and deformed radially outward to engage with a second of the ears, for solidly securing the locking pin to the ears.

The first ear includes a cavity formed therein, the head includes a projection extended from the flat peripheral surface thereof for engaging into the cavity of the first ear, and for solidly securing the head to the first ear.

The second end of the locking pin includes a peripheral groove formed therein, and a retaining ring engaged with the peripheral groove of the locking pin and engaged with the second ear for solidly securing the locking pin to the first ear.

The second end of the locking pin includes at least one slot formed therein for defining at least one flap, and for allowing the flap to be easily expanded and deformed radially outward to engage with the second ear.

The head includes an outer portion having a convex bulge extended outward therefrom for increasing a strength of the head of the locking pin.

A lock latch may further be provided and includes a stud having an outer diameter greater than an inner diameter of the peripheral wall, for allowing the stud to be force-fitted into the opening of the locking pin, and for securing the locking pins to the ears.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
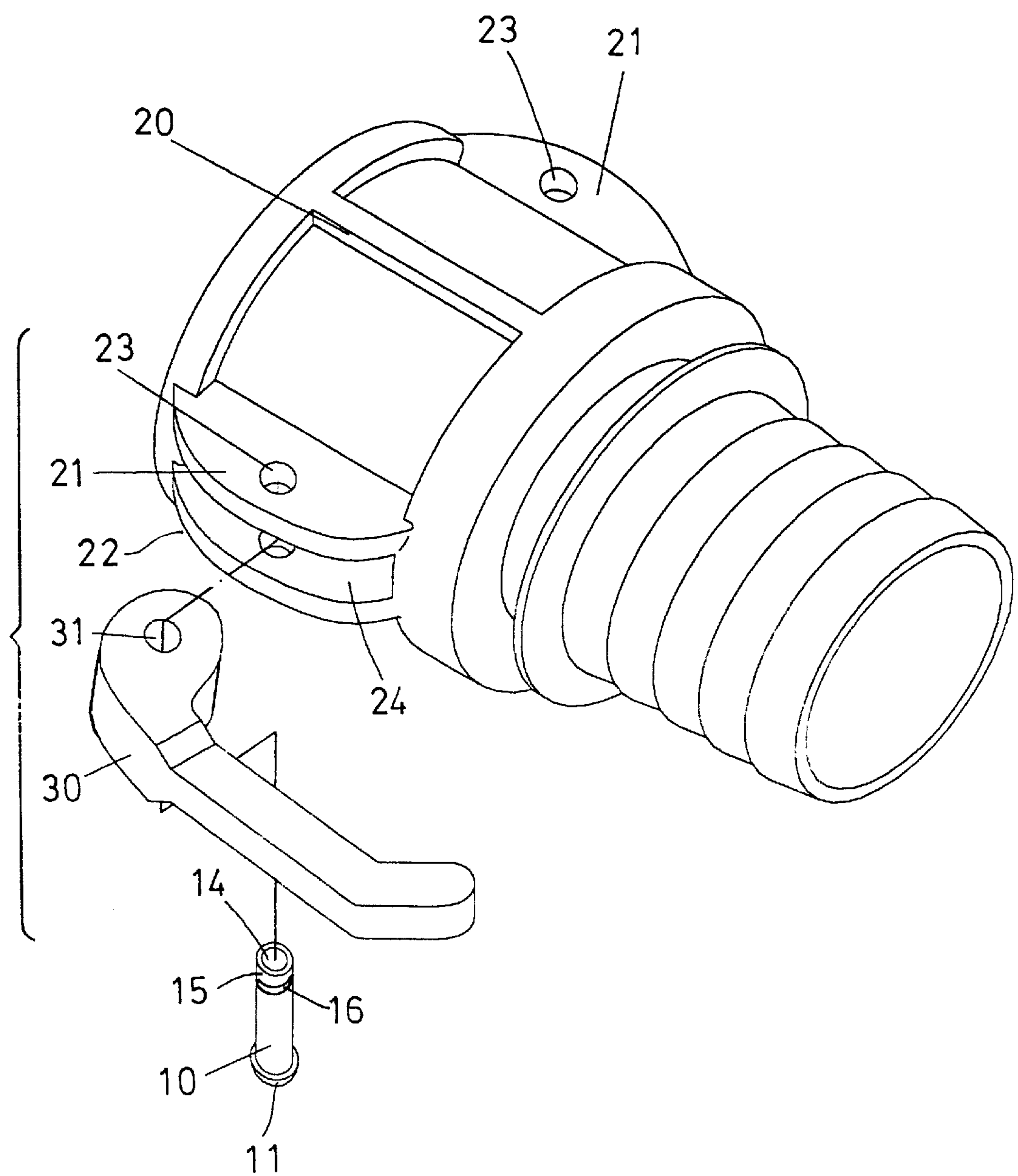
FIG. 1 is an exploded view illustrating a coupler or an object having a locking pin in accordance with the present invention.

Referring to the drawings, and initially to FIGS. 1–5, a coupler or an object in accordance with the present invention comprises a body 20 including one or more pairs of ears 21, 22 provided thereon or extended therefrom. Each pair of the ears 21, 22 each includes an orifice 23 formed therein, and a channel 24 formed between the pair of ears 21, 22.

A handle or a hand grip or an arm or a lever 30 includes one end engaged in the channel 24 of the object body 20 and having an aperture 31 formed therein for aligning with the orifices 23 of the ears 21, 22. A locking pin 10 is engaged through the orifices 23 of the ears 21, 22 and the aperture 31 of the lever 30 for pivotally or rotatably securing the lever 30 to the ears 21, 22 of the object body 20.

The locking pin 10 preferably includes a solid structure, but may also include a hollow structure. The locking pin 10 includes one end having a head 11 formed or provided thereon. The head 11 includes a convex bulge 12 extended outward from the outer portion thereof for increasing the strength of the head 11, and includes a flat inner peripheral surface 13 for flatly and for solidly engaging with one of the ears 21, 22, best shown in FIG. 2.

The head 11 may further or selectively include a projection 18 extended from the flat inner peripheral surface 13 thereof for engaging into the corresponding cavity 27 of the ears 21, 22 (FIG. 2), for further solidly securing the head 11 and thus the locking pin 10 to the ears 21, 22, and for preventing the head 11 and thus the locking pin 10 from being deformed relative to the ears 21, 22.

Figure 2:
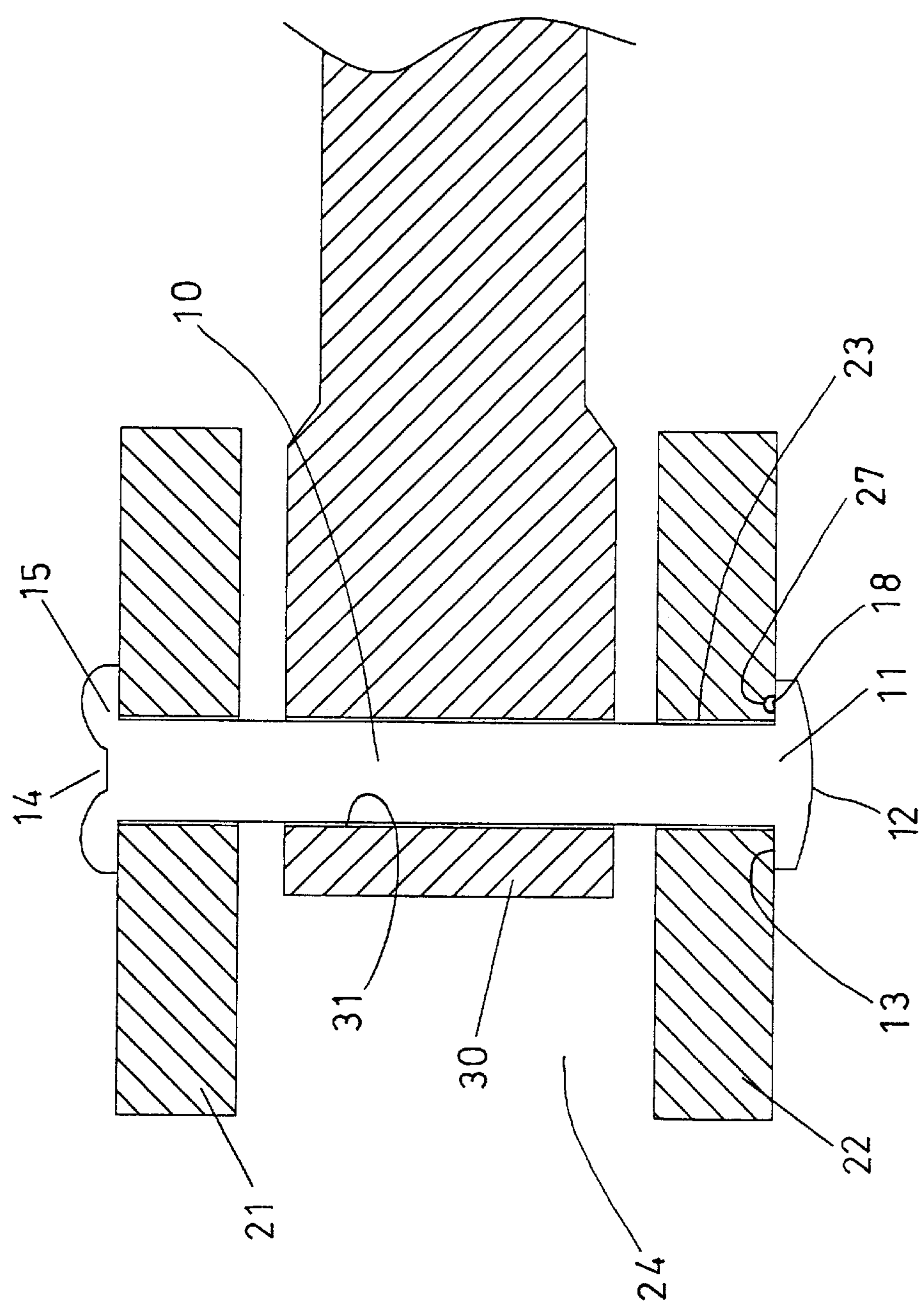
FIG. 2 is a partial cross sectional view illustrating the attachment of the locking pin to the object.
Figure 3:
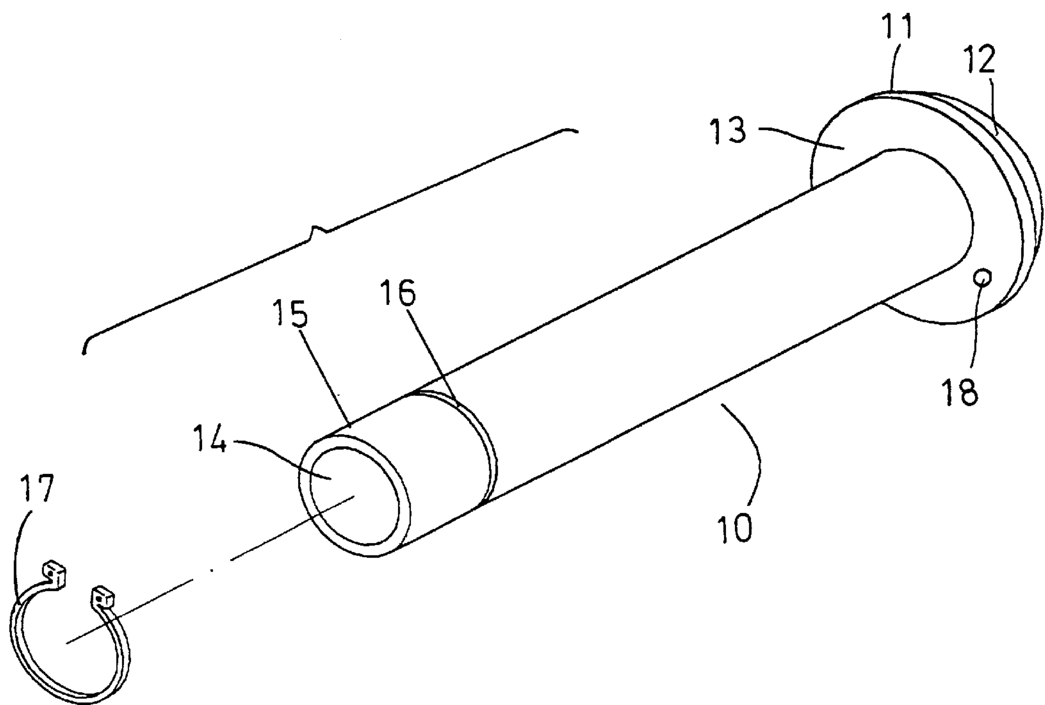
FIG. 3 is an exploded view illustrating the locking pin device of the object.
Figure 4:
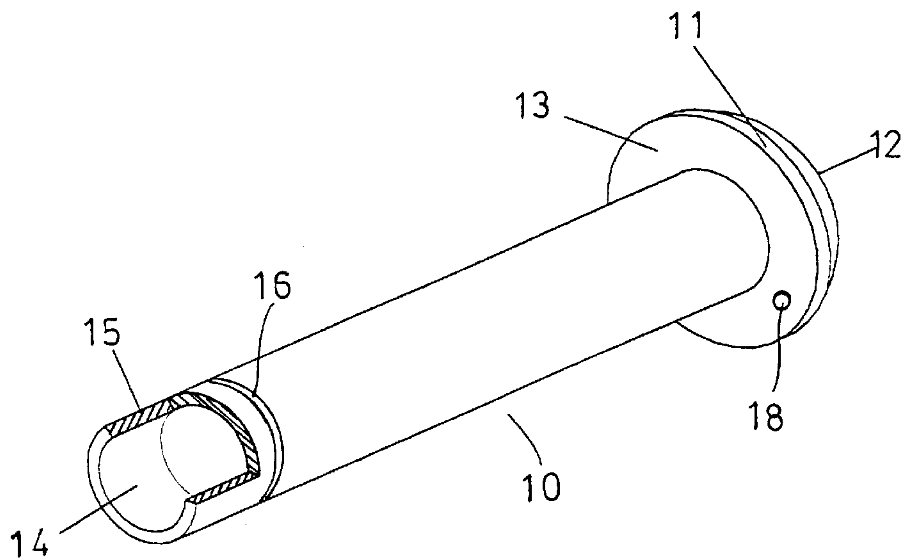
FIG. 4 is a perspective view showing the locking pin, in which a portion of the locking pin is cut off for showing the inner structure of the locking pin.
Figure 5:
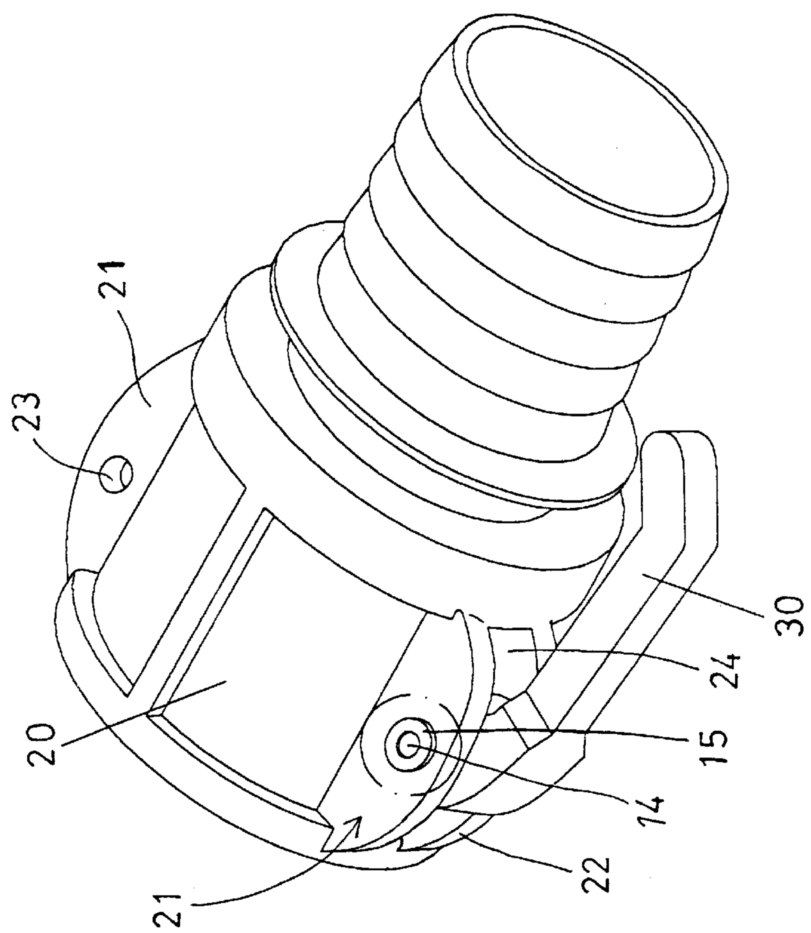
FIG. 5 is a perspective view illustrating the attachment of the locking pin to the object.
Figure 6:
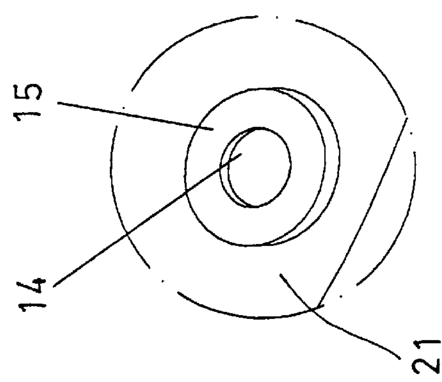
FIG. 6 is a partial perspective view illustrating the deformation of the locking pin for securing to the object.

The locking pin 10 may include an opening 14 formed in the other end thereof, best shown in FIGS. 2 and 4, and may include a peripheral wall 15 provided thereon for forming or defining the opening 14 thereof. The peripheral wall 15 may be suitably expanded or hammered or forged or deformed radially outward, best shown in FIGS. 2, 5, 6, for solidly securing the locking pin 10 to the ears 21, 22, and for pivotally or rotatably securing the lever 30 to the ears 21, 22 of the object 20.

The locking pin 10 may include a peripheral groove 16 formed in the other end thereof, for receiving a clamping or retaining ring 17 which may engage with either of the ears 21, 22 for further solidly securing the locking pin 10 to the ears 21, 22, preferably before the peripheral wall 15 is expanded or hammered or forged or deformed radially outward to engage with the ears 21, 22.

Figure 7:
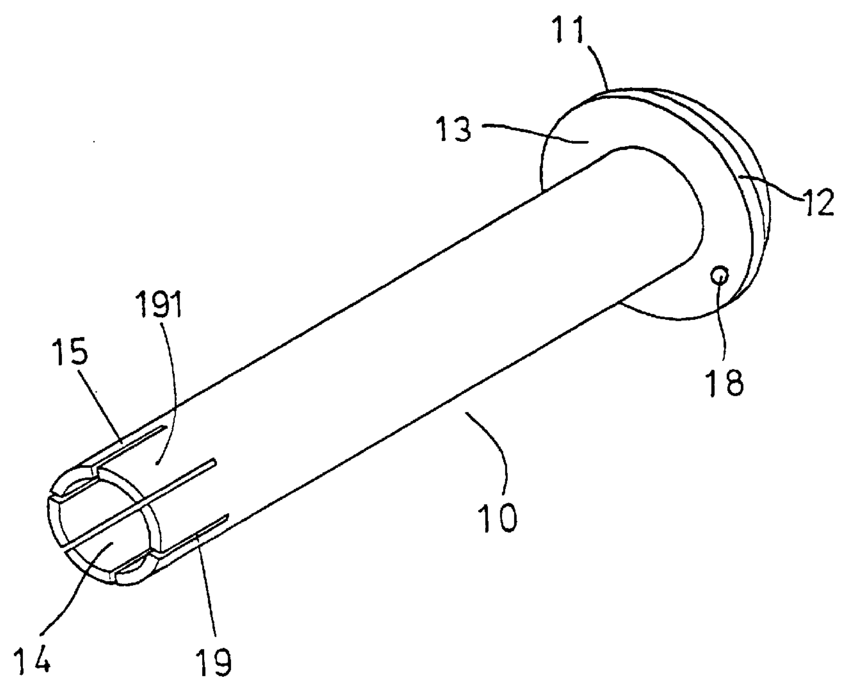
FIG. 7 is a perspective view illustrating the other arrangement of the locking pin.

Referring next to FIG. 7, the other end of the locking pin 10 may further include one or more longitudinal slits 19 formed therein, for forming one or more flaps 191 on the other end of the locking pin 10, and for allowing the flaps 191 to be easily expanded or hammered or forged or deformed radially outward to engage with the ears 21, 22.

Figure 8:
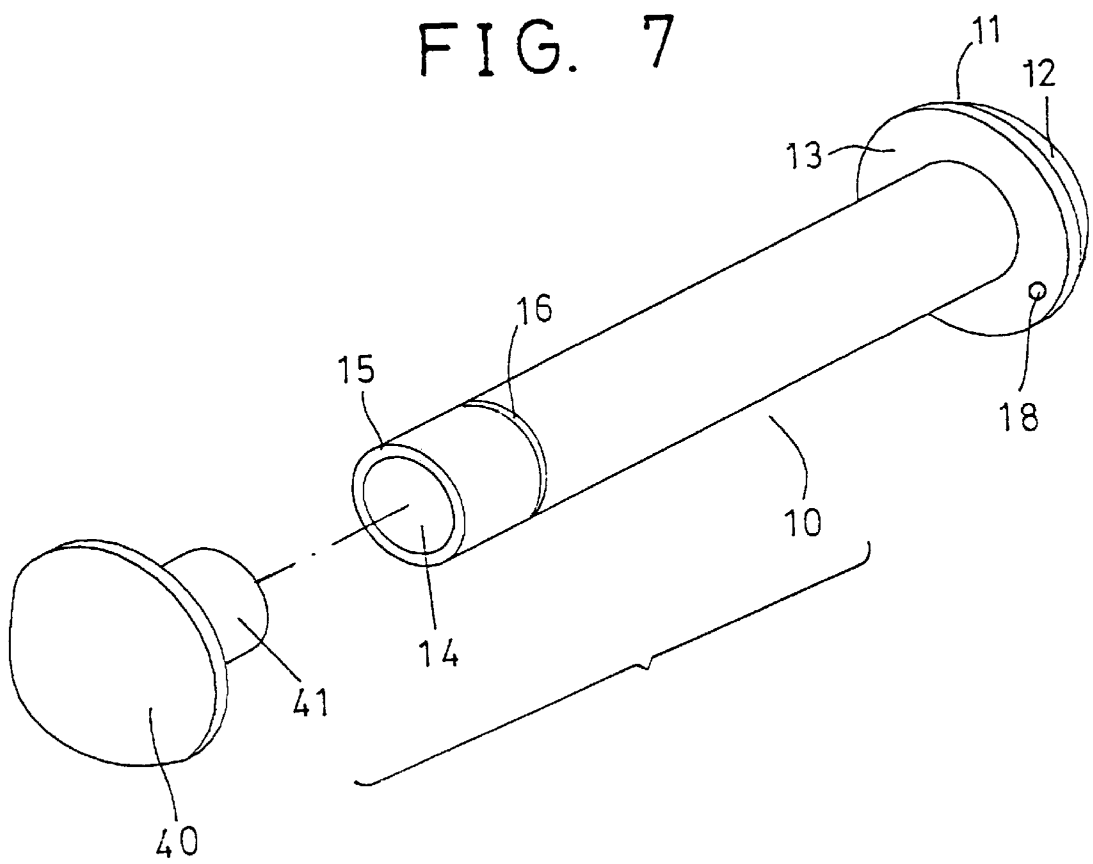
FIG. 8 is an exploded view illustrating the other embodiment of the locking pin.

Referring next to FIG. 8, a lock latch 40 may further be provided and may include a stud 41 having an outer diameter slightly greater than the inner diameter of the peripheral wall 15, for allowing the stud 41 to be force-fitted into the opening 14 of the peripheral wall 15, and for solidly securing the locking pin 10 to the ears 21, 22 of the object 20.

Accordingly, the object in accordance with the present invention includes a locking pin having a solid securing structure for allowing the locking pin to be solidly securing to the object.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A coupler comprising:

a body including a pair of ears having a channel formed between said ears, said ears each including an orifice formed therein, a first ear of said ears including a cavity formed therein, a lever including a first end received in said channel of said body, and having an aperture formed therein for aligning with said orifices of said ears, and a locking pin engaged through said orifices of said ears and said aperture of said lever, for pivotally securing said lever to said ears, said locking pin including a first end having a head provided thereon, said head including an inner portion having a flat peripheral surface formed thereon for flatly engaging with a first ear, said head including a projection extended from said flat peripheral surface thereof for engaging into said cavity of said first ear, and for solidly securing said head to said first ear, and said head including an outer portion having a convex bulge extended outward therefrom, opposite to said inner flat peripheral surface thereof, for increasing a strength of said head of said locking pin, and said locking pin including a second end having an opening formed therein and a peripheral wall provided thereon for defining said opening thereof, and said peripheral wall being allowed to be expanded and deformed radially outward to engage with a second ear of said ears, for solidly securing said locking pin to said ears, said second end of said locking pin including a peripheral groove formed therein, and a retaining ring engaged with said peripheral groove of said locking pin and engaged with said second ear for solidly and rotatably securing said locking pin to said first ear.

* * * * *